(No Model.) 4 Sheets—Sheet 1.

S. B. PARSONS.
MACHINE FOR MAKING AXLE SKEINS.

No. 383,761. Patented May 29, 1888.

Witnesses:—
Louis M. T. Whitehead.
Orcatrus Dayton

Inventor:—
Seneca B. Parsons.
by:—
Dayton & Poole
Attorneys.

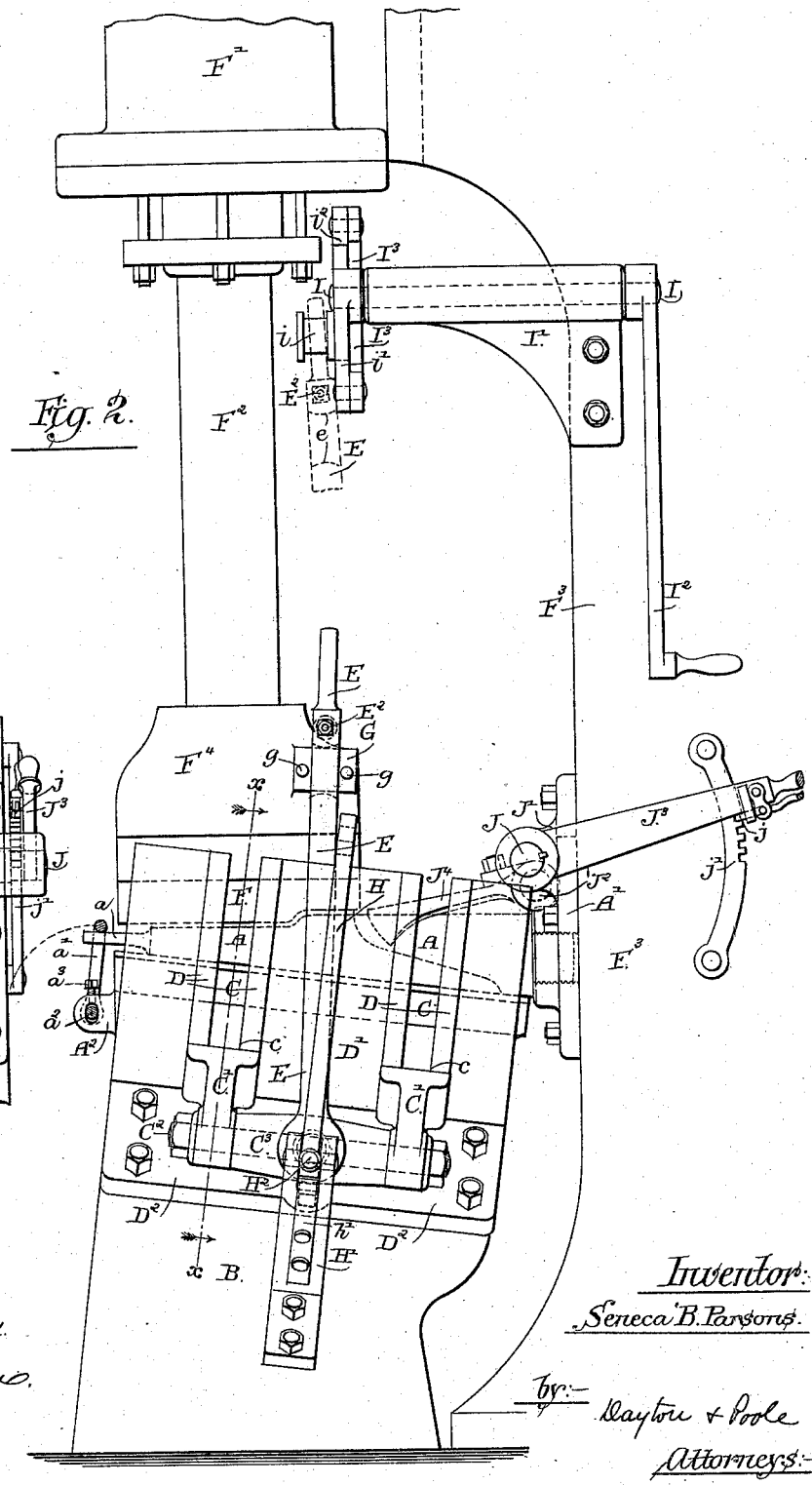

(No Model.) 4 Sheets—Sheet 3.
S. B. PARSONS.
MACHINE FOR MAKING AXLE SKEINS.
No. 383,761. Patented May 29, 1888.
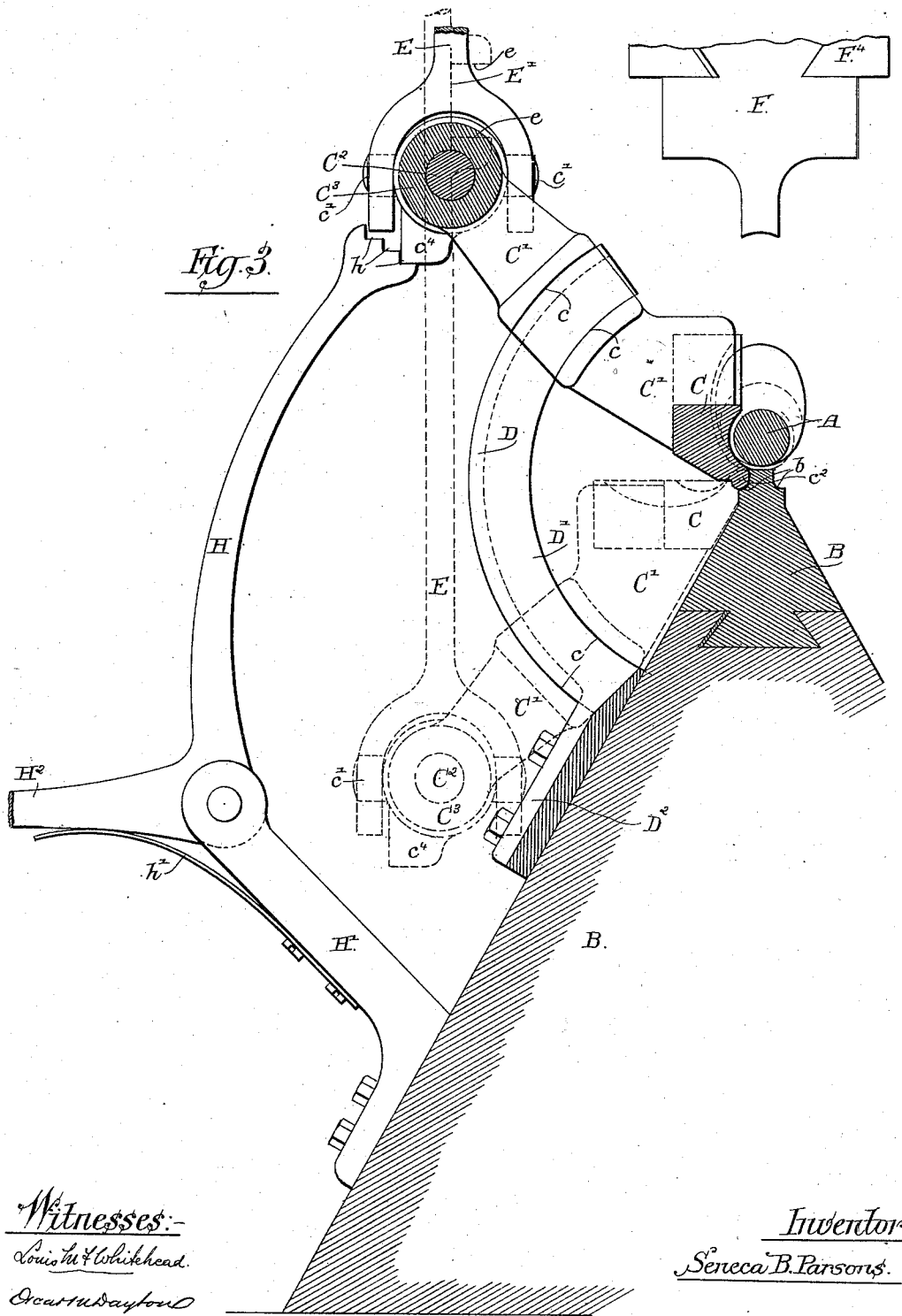
Witnesses:
Louis M. Whitehead
Orcar M. Dayton
Inventor:
Seneca B. Parsons.
by:— Dayton & Poole
Attorneys:—

(No Model.) 4 Sheets—Sheet 4.

S. B. PARSONS.
MACHINE FOR MAKING AXLE SKEINS.

No. 383,761. Patented May 29, 1888.

Witnesses:
Louis H. Whitehead
Oscar W. Dayton

Inventor:
Seneca B. Parsons.
by — Dayton & Poole
Attorneys.

UNITED STATES PATENT OFFICE.

SENECA B. PARSONS, OF CHICAGO, ILLINOIS.

MACHINE FOR MAKING AXLE-SKEINS.

SPECIFICATION forming part of Letters Patent No. 383,761, dated May 29, 1888.

Application filed November 21, 1887. Serial No. 255,729. (No model.)

*To all whom it may concern:*

Be it known that I, SENECA B. PARSONS, of Chicago, in the county of Cook and State of Illinois, have invented certain new and useful Improvements in Machines for Making Axle-Skeins; and I do hereby declare that the following is a full, clear, and exact description thereof, reference being had to the accompanying drawings, and to the letters of reference marked thereon, which form a part of this specification.

This invention relates to an improved machine for forging and welding tubular sheet-metal axle-skeins.

The invention consists in the matters hereinafter described, and pointed out in the appended claims.

The improved machine herein shown as embodying my invention embraces as its main or essential features a mandrel, over or about which the metal blank for forming the skein is wrapped or bent, folding-dies corresponding in general shape with the mandrel for bending the metal blank about and pressing it into contact with the mandrel, and a hammer constructed to act upon the marginal parts of the blank at the line at which they are brought together to accomplish the welding of the same.

Figure 1:
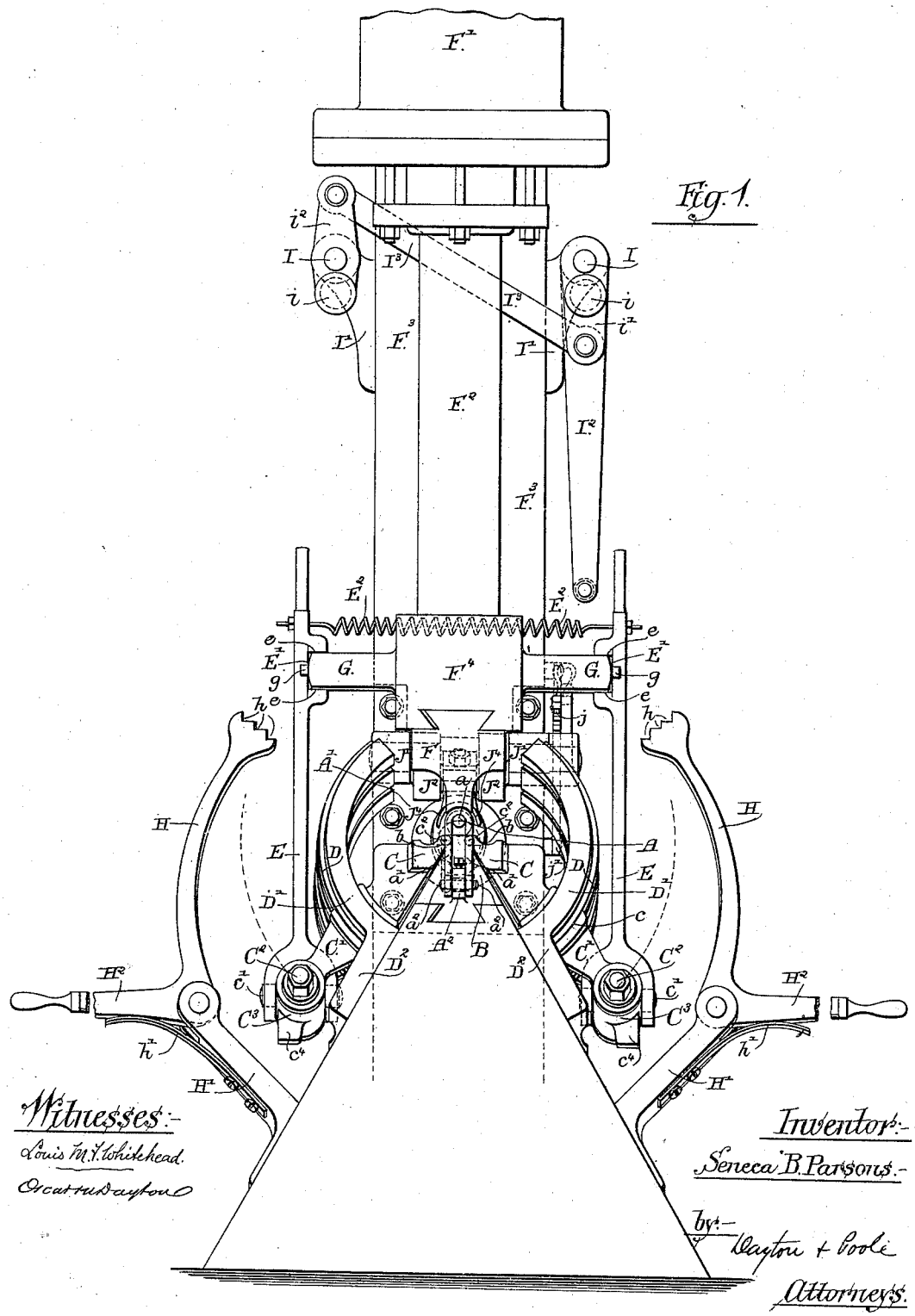
Figure 6:
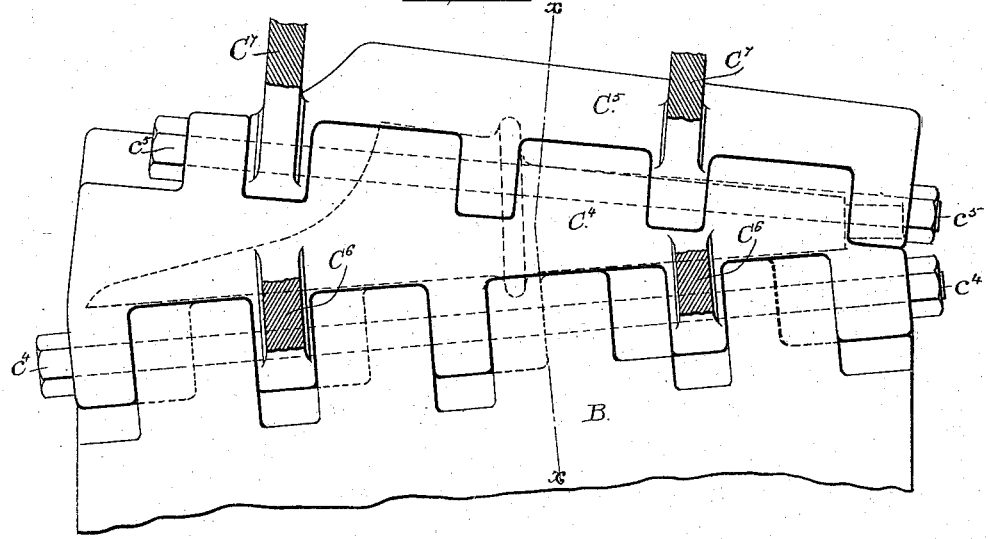
Figure 7:
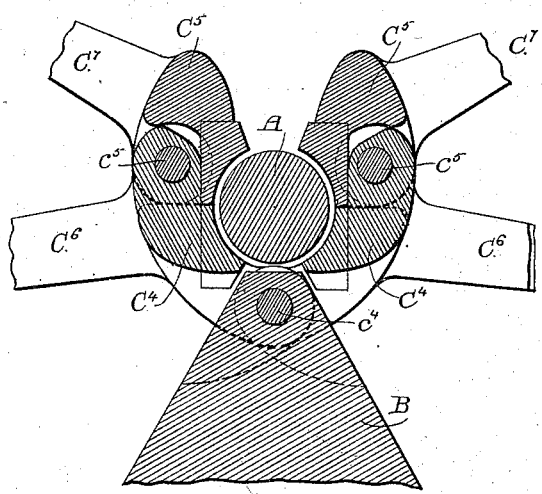
Figure 5:
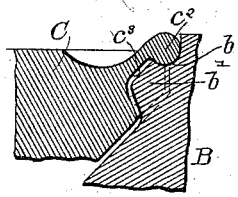

In the accompanying drawings, Figure 1 is a front elevation of a machine embodying my invention. Fig. 2 is a side view of the machine shown in Fig. 1. Fig. 3 is an enlarged detail section taken upon line $x\ x$ of Fig. 2. Fig. 4 is a detail elevation showing a device for removing the welded skein from the mandrel. Fig. 5 is a detail section showing parts of the forming-dies and anvil-block, illustrating a modified form of the connection between said parts. Fig. 6 is a side view of a modified form of the folding-dies. Fig. 7 is a sectional view taken upon line $x\ x$ of Fig. 5.

As illustrated in the said drawings, A is the mandrel; B, a stationary support or anvil-block located beneath the mandrel.

C C are two folding-dies, which are sustained in such manner as to admit of a rotative motion thereof about pivotal axes adjacent to the upper surface of the anvil-block and near the lower surface of the mandrel.

C' C' are heavy arms or castings, which form the supports of the said dies, and which are provided with curved guide-grooves $c$, engaging heavy curved guides D D, arranged at opposite sides of the mandrel and anvil-block concentrically with the pivotal axes, about which the folding-dies rotate.

F is a hammer located over the mandrel and acting upon a part of the latter which is exposed between the free or outer ends of the folding-dies when the latter are closed about the mandrel.

I have herein shown each folding-die as provided with two parallel arms, C' C', provided upon opposite sides with guide-grooves $c\ c$, while four parallel curved guides, D D D D, arranged in opposing pairs, are employed to engage the said guide-grooves. The arms C' C' are extended outwardly past or beyond the curved guides D D, and at their outer ends said arms are pivotally connected with vertically-arranged rods E E, the upper ends of which are engaged by a suitable lifting device operating to carry the arms C' C' upwardly, and to thereby bring the folders against the mandrel. In the instance illustrated the two parallel arms C' C' belonging to each folding-die are engaged at their ends with a bolt, $C^2$, which passes through a heavy sleeve, $C^3$, which fills the space between the arms, and to which the lower forked end of the bar E is connected by means of pivot-pins or trunnions $c'\ c'$ upon the said sleeve. The guides D D are rigidly and immovably supported with relation to the anvil-block and mandrel, said guides in the particular construction illustrated being formed by a heavy integral casting, D', which is bolted at its lower end to the sides of the anvil-block by bolts passing through a massive flange, $D^2$, at the lower margin of the casting D'. The die-blocks and arms C' C' have a rotative motion through a distance sufficient to enable them to be swung backwardly and downwardly to a point level with or below the upper surface of the anvil-block, so as to enable the flat blank to be thrust beneath the mandrel and over the said dies when the latter are open, the mandrel being sustained with its lower surface above the top surface of the die-block B a sufficient distance to enable the flat blank to be inserted between said parts. The guide-grooves $c\ c$ of the arms C' C' are made of considerable length, so as to afford long bearing-surfaces in engagement with the guides. By this construction said arms are adapted to strongly and positively hold the folding-dies in position with relation to the mandrel during the time the dies are being moved and after the folding has been accomplished. I have herein provided, however, a support for the ends of the folding-dies, which are beneath and adjacent to the mandrel, by constructing longitudinal bearing recesses or sockets $b$ $b$ in the opposite sides of the anvil-block adjacent to its upper surface, and by providing the folding-dies with rounded or cylindric marginal ribs $c^2$ $c^2$, which rest within the said recesses. As illustrated in Figs. 1, 2, and 3, the recesses $b$ extend through about one-fourth of a circle and engage the inner and lower surfaces of the ribs $c^2$ $c^2$, so that they afford a rigid support to the folding-dies as the outer parts of the latter are carried upwardly. In this construction, when the folding-dies are brought upwardly and stand opposite the mandrel, the long bearing of the grooves $c$ against the guides D D will be relied upon to rigidly hold the folding-dies from outward movement, the recesses $b$ $b$ not being so formed as to retain the folding-dies from outward movement at such time. In case additional support is found necessary for the folding-dies at their inner or pivotal ends, however, the construction shown in Fig. 5 may be employed, wherein the dies are provided in their faces adjacent to the anvil-block with one or more recesses, $c^3$, into which extend prongs or fingers $b'$ upon the anvil-block, the cylindric ribs $c^2$ of the guide-blocks in this instance being engaged with the upwardly-curved surfaces of the prongs $b'$, thereby affording a joint between the folding-dies and the anvil-block, resembling a hinge and acting to positively hold the lower ends of the dies from outward movement in all positions of the latter.

The particular construction shown and above described in the folding-dies and means for supporting the same are to enable the pivotal axes, about which the folding-dies rotate, to be brought as close as possible to the lower surface of the mandrel, while at the same time affording the necessary rigid support for the folding-dies. By making the guides D and the arms C' C' of suitable size and strength and the guide-grooves $c$ $c$ in the arms of suitable length the employment of the anvil-block B to afford support to the inner edges of the folding-dies may be dispensed with. Under ordinary circumstances, however, a machine adapted for effective operation may be made wherein the pivotal axes of the folding-dies are slightly below the mandrel, as is the case with the machine herein shown, and when this construction is used the anvil-block may be conveniently arranged to engage the folding-dies and to take a part of the outward strain coming upon the latter, with the advantage of lessening the size and weight necessary in the other parts of the machine.

While I do not desire to be limited in the appended broad claims to a construction embracing an anvil-block constructed to afford support for the folding-dies, this construction is of advantage, and is herein claimed as a special improvement.

The folding-dies C C are not constructed to entirely close and surround the mandrel, but are so arranged as to leave a longitudinal space between their upper edges along the top surface of the mandrel, in which space the margins of the sheet-metal blank which are to be united are exposed, to enable the welding-hammer F to properly act thereon while the metal blank is held by the dies in contact with the mandrel.

The hammer F is located over the mandrel, and its working-face is made long and narrow, of proper size and shape to enter between the free margins of the folding-dies when the latter are closed about the mandrel. The hammer F preferably has a vertical reciprocatory motion, and may be actuated by any suitable means. In the particular construction herein shown the hammer is actuated by steam and forms part of a steam-hammer, the cylinder of which is seen at F' and piston at $F^2$. As herein shown, the steam-hammer is applied to lift the folding-dies into contact with the mandrel, as well as for performing the welding of the metal. The particular means employed for affording operative connection between the steam-hammer and the folding-dies will be hereinafter described.

The mandrel A may be sustained by any suitably-arranged support in such manner as to allow the withdrawal of the welded skein from the smaller end thereof. In the particular construction herein illustrated the mandrel is attached at its larger end to the frame-piece or upright $F^3$ of the steam-hammer. The connection between the parts is shown as formed by means of a screw-threaded shank upon the mandrel, engaging a screw-threaded socket in a plate, A', bolted to the standard $F^3$. For the purpose of holding the smaller end of the mandrel from being lifted or thrown upwardly as the blank is forced upwardly against it in the act of lifting the folding-dies, the said mandrel is provided at its smaller end with a stem, $a$, adapted for engagement with a movable support or bearing attached to an adjacent stationary part. Such movable bearing may be conveniently formed by a pivoted link, $a'$, secured to a bracket, $A^2$, which is bolted to the anvil-block. The bracket $A^2$ is shown as provided with vertical slots to receive the pivot $a^2$ of the link, and as provided with a set-screw, $a^3$, bearing upon the pivot. Said set-screw enables the link to be tightened upon the stem $a$ when found necessary or desirable. When the folding-dies are being moved to fold the metal, the link $a'$ is maintained in engagement with the stem $a$; but when the folding and welding of the blank has been accomplished the link is thrown off of the stem, thereby enabling the welded skein to be drawn from the free end of the mandrel and a new blank to be inserted.

The means employed in the machine shown to accomplish the lifting of the folding-dies by the action of the steam-hammer are as follows: Upon opposite sides of the head $F^4$ of the piston-rod, to which head the hammer proper is attached, are secured two horizontal arms, G G, the outer ends of which are constructed to engage notches or recesses $E'$ $E'$ in the inner sides of the bars E. The said arms G G are provided with pins or fingers $g$ $g$, engaging opposite sides of the bars E E, to hold the latter from shifting sidewise and thus becoming disengaged from said arms G G. In the particular construction shown the arms G G have flat top and bottom surfaces, and the upper and lower surfaces, $e$ $e$, of the notches engaged therewith are rounded, in the manner clearly shown in dotted lines in Fig. 2. The purpose of said rounded surfaces is to afford an angular movement in the bars E E with relation to the arms G G. In the machine shown the tapering mandrel A is arranged with its top surface approximately horizontal and its lower surface inclined, the top surface of the mandrel being arranged horizontally, in order that the hammer may move perpendicularly to the opposing surface of the mandrel in the act of welding the metal. This location of the mandrel brings the pivoted axes of the folding-dies in an inclined position, so that the folding-dies and arms C C swing in inclined planes and the guides D D stand at an angle to the vertical. Inasmuch as the direction of motion of the hammer is vertical, the inclined path taken by the outer ends of the arms $C'$ $C'$ obviously necessitates swinging or pivotal connection of the ends of the rods E E with the said arms $C'$ $C'$ and with the hammer. Such pivotal connection is formed at the lower ends of the rods E E by means of the pivot pins or trunnions $c'$ $c'$, by which the said rods are connected with the sleeves $C^2$ $C^2$, and at the upper ends of the rods by the curved or rounded engaging-surfaces $e$ $e$ of the notches $E'$ $E'$, above described.

The bars E E are held normally in position to engage the arms G G by a suitably-applied spring or springs, a single spiral spring, $E^2$, connected at its opposite ends with the bars, being herein shown as employed for the purpose. When the folding-dies are open, the arms $C'$ $C'$ are at the lower limit of their movement, and the arms G are engaged with the notches $E'$ $E'$. By an upward movement of the hammer the rods E E may be carried upwardly, thereby lifting the free ends of the arms $C'$ $C'$ and closing the folding-dies about the mandrel. To sustain the arms $C'$ $C'$ after the folding of the blank is completed, I have herein shown pivoted detents H H, which are provided at their free ends with a series of notches, $h$ $h$ $h$, either of which may be engaged with an angular projection, $c^4$, upon the sleeve $C^3$. The detents H H are herein shown as pivoted at their lower ends upon frame-arms $H'$ $H'$, bolted to the sides of the anvil-block, and as provided with hand-levers $H^2$ $H^2$, by which they may be moved to release them from the sleeves $C^3$ $C^3$, to allow the arms $C'$ $C'$ to descend. Springs $h'$ $h'$ may be applied to the detents H H, to cause the latter to automatically engage the arms $C'$ $C'$ when said arms reach the upward limit of their movement.

After the folding-dies have been closed about the mandrel by the action of the hammer, it is obviously necessary that the bars E E should be released from the arms G G, in order to enable the hammer to operate free of said bars in welding the blank. The said bars may of course be disengaged from the arms G G by hand after the arms $C'$ $C'$ have been lifted and secured in their elevated position. I prefer, however, to employ a device adapted to disengage both of the bars E E at once from the arms G G, and I have herein shown a device for the purpose, which is made as follows: I I are two rock-shafts mounted upon the frame-arm $F^3$ of the steam-hammer and provided with cranks $i$ $i$, which are located in position to engage the upper ends of the bars E E, when the latter are at the upward limit of their movement. The shafts I I are herein shown as mounted in brackets $I'$, attached to the standard $F^3$, and one of said shafts is provided with a depending crank-arm, $I^2$, by which the shaft may be turned for moving the crank $i$. Suitable operative connection is made between the shafts I I, so that when one shaft is moved by the crank $I^2$ the other shaft will be correspondingly moved. The particular device for this purpose, herein shown, consists of a connecting-bar, $I^3$, pivoted at one end to an extension, $i'$, of the crank $i$ upon one shaft, and at its opposite end to a crank-arm, $i^2$, upon the other shaft. The connecting-rod $I^3$ obviously produces an opposite or outward movement in both of the cranks $i$ $i'$ when the hand-lever $I^2$ is moved or swung in a direction to throw the cranks outwardly against the bars E.

In the operation of making a skein by the employment of the devices above described a flat sheet-metal blank of the proper shape is inserted beneath the mandrel and over the anvil-block at the time the forming-dies are open or thrown outwardly and downwardly. When the dies are open, the hammer will be depressed and will rest adjacent to the mandrel, and the arms G G will be engaged with the vertical bars E E. After the blank is in place and is in readiness for bending and welding, steam will be admitted to the lower end of the cylinder $F'$ to lift the piston, with the head $F^4$ and arms G. The latter will carry with them the rods E, and thereby close the folding-dies about the mandrel. When the arms $C'$ $C'$, which carry the dies, have reached the upward limit of their movement, said arms will be engaged by the detents H H, which will prevent them from falling and the dies from opening, and the hand-lever $I^2$ will then be manipulated to free the said bars E E from the arms G G. Said bars will be held free from the arms against the action of the spring $E^2$ by the crank-arms $i$ $i$ during the time that the welding is being accomplished by the action of the hammer upon the exposed edges of the metal at the top of the mandrel. The operator will commonly hold the crank-arm I² in position to retain the said bars E E free from the arms G G while the welding is being accomplished. If desired, however, a suitable detent may be employed to retain the crank-arm I² in the position in which it is placed. After the welding has been accomplished, the hammer will be arrested near the upward limit of its movement, with the arms G G opposite the notches E' E', and the bars E E will then be released and allowed to engage the said arms. The detents H H will then be disengaged from the arms C' C', and the hammer will be allowed to descend to carry the arms C' C' downwardly and open the dies to allow the removal of the welded skein from the mandrel.

I do not consider the employment of detents for holding the folding-dies closed while the welding is being accomplished to be necessary in all cases, inasmuch as the outward pressure upon the dies coming against the curved engaging-surface of the arms C' and guides D will tend to produce sufficient frictional engagement between said parts to hold the arms C' C' from downward movement. In other words, the outward pressure of the dies will tend rather to force the bearing-surfaces of the arms C C against said guides D than to turn said arms and the dies about their pivots.

The finished or welded skein may be removed from the mandrel by the employment of hand-tools; or, if preferred, a special appliance may be attached to the machine for this purpose.

I have shown in Figs. 2 and 4 a simple device for thrusting the skein endwise from the mandrel, which is constructed as follows: J is a rock-shaft mounted in brackets J' J', near the larger end of the mandrel and above the same. Said rock-shaft is provided with a crank, J², and with a hand-lever, J³. J⁴ is a push-rod, connected at one end with a crank, J², and resting at its opposite or free end upon the upper surface of the mandrel. Said free end of the push-rod is flattened and curved to conform to the upper surface of the mandrel, and is adapted to engage the rear margin of the blank thereon. When the skein is being welded, the hand-lever J³ will be thrown upwardly, so as to carry the push-rod J⁴ backwardly out of the way of the folding-dies and hammer. After the skein is completed, the hand-lever will be depressed and the push-rod thereby thrown forward against the rear edge of the skein in a manner to force the same toward the smaller and free end of the mandrel. The hand-lever J³ is herein shown as provided with a detent, j, engaging a notched segment, j', to hold the push-rod free from the blank during the welding operation.

In Figs. 6 and 7 I have illustrated a somewhat different form of folding-dies, wherein each die consists of two parts, C⁴ C⁵, the part C⁴, nearest the anvil-block, being connected by a central pivot, c⁴, to the said mandrel, while the part C⁵, remote from the anvil-block, is connected with the part C⁴ by a longitudinal pivot, c⁵. In a construction of this kind the parts C⁴ and C⁵ of the folding-dies will commonly be provided with separate actuating-arms C⁶ and C⁷. The dies C⁴ and C⁵ will be actuated in succession, so as to first fold the lower or inner part of the blank against the mandrel, and then complete the folding or shaping of the skein by carrying the outer parts of the blank against the mandrel.

The machine shown is more particularly intended for welding by what is called a "butt-weld," the edges of the blank being brought forcibly together edge to edge over the mandrel by the folding-dies, and then hammered down flat against the mandrel to complete the joint. The same machine may, however, be employed for making a "lap-weld," in which the edges of the metal are overlapped and hammered down to an even thickness. It will of course be understood that in the use of the machine for making butt-welded skeins a roller, wiper, or presser may be employed to act upon the joint of the metal for closing and smoothing the same, instead of the hammer shown, and such wiper or presser is included in the appended claims as an equivalent of the hammer illustrated.

I consider the construction embracing a mandrel, folding-dies, and a welding-hammer to be broadly new, and this construction is herein claimed without restriction to the employment of the particular means for movably supporting and actuating the folding-dies herein illustrated. The particular means for supporting the folding-dies (illustrated in Figs. 1, 2, and 3, and above described) in themselves, however, form an important improvement in machines for making axle-skeins, and a construction embracing these features is herein claimed as a special improvement.

I claim as my invention—

1. A machine for shaping and welding axle-skeins, comprising a mandrel, movable folding-dies, and a hammer, substantially as described.

2. A machine for the purpose stated, comprising a mandrel, a stationary anvil-block having a narrow longitudinally-arranged working-surface adjacent to the mandrel, and folding-dies mounted to rotate about longitudinal axes adjacent to the surface of the mandrel and at opposite sides of the working-surface of the anvil-block, substantially as described.

3. A machine for the purpose stated, comprising a mandrel, a stationary anvil-block having a narrow longitudinally-arranged working-surface adjacent to the mandrel, and pivotally-supported folding-dies located at opposite sides of said anvil-block and having pivotal support at their inner edges upon the said anvil-block, substantially as described.

4. The combination, with a mandrel and supports for the same, of a stationary anvil-block located longitudinally beneath the mandrel, folding-dies located at both sides of the mandrel, and a welding-hammer acting upon the top surface of the mandrel, substantially as described.

5. The combination, with a mandrel and movable folding-dies, of supports for the dies comprising curved guides and supporting arms or castings attached to the dies and engaging said guides, substantially as described.

6. The combination, with a mandrel and an anvil-block provided with longitudinal lateral bearing-recesses, of folding-dies engaging said recesses at their inner edges, arms or castings attached to the dies, and stationary curved guides engaging said arms or castings, substantially as described.

7. The combination, with a mandrel and movable folding-dies, of a reciprocating hammer applied to act against the mandrel, and means detachably connecting the hammer with the folding-dies, whereby the latter may be actuated by a movement of the hammer, substantially as described.

8. The combination, with a mandrel and movable folding-dies mounted to rotate about longitudinal axes, of a reciprocating hammer applied to act against the mandrel, and means detachably connecting the free or outer parts of the dies with the hammer, whereby the dies may be closed about the mandrel by the movement of the hammer, substantially as described.

9. The combination, with a mandrel, of pivoted folding-dies, arms attached to the dies for actuating the same, and detents engaging the said arms for holding the dies in their closed position, substantially as described.

10. The combination, with a mandrel and pivotally-supported folding-dies, of a vertically-reciprocating hammer acting against the mandrel, and bars E E, connected with the folding-dies and adapted for detachable engagement with the hammer, substantially as described.

11. The combination, with a mandrel and pivotally-supported folding-dies, of a reciprocating hammer acting against the mandrel, bars E E, pivotally connected with the folding-dies and constructed for detachable connection with the hammer, springs applied to throw said bars into position to engage the hammer, and means upon the machine-frame for throwing and holding said bars out of engagement with the hammer, substantially as described.

12. The combination, with a mandrel and folding-dies, of bars E E, pivotally connected with the folding-dies, arms G G upon the hammer, engaging notches in the said bars E E, springs applied to hold the said bars E E in engagement with the arms G G, and connected rock-shafts I I, provided with cranks $i\ i$, engaging said bars E E, substantially as described.

13. The combination, with a mandrel and folding-dies, of a rigid support for one end of the mandrel, and a movable support or bearing for the opposite end thereof, detachably engaged with the mandrel, substantially as described.

14. The combination, with a mandrel, folding-dies, and hammer, of means for removing the finished skein from the mandrel, embracing a push-bar, $J^4$, and a rock-shaft provided with a crank engaging said push-bar, substantially as described.

In testimony that I claim the foregoing as my invention I affix my signature in presence of two witnesses.

SENECA B. PARSONS.

Witnesses:
C. CLARENCE POOLE,
O. N. WILLIS.